United States Patent
Baker et al.

(10) Patent No.: US 6,834,750 B2
(45) Date of Patent: Dec. 28, 2004

(54) INTEGRATED STARTER-GENERATOR ROLLER CLUTCH

(75) Inventors: Richard D. Baker, Ypsilanti, MI (US); Russell E. Monahan, Ann Arbor, MI (US); Richard Jacobson, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/316,808

(22) Filed: Dec. 11, 2002

(65) Prior Publication Data

US 2004/0112701 A1 Jun. 17, 2004

(51) Int. Cl.⁷ .............................. F16D 3/34; B60K 23/08
(52) U.S. Cl. .......................................... 192/44; 192/38
(58) Field of Search ............................. 192/44, 40, 38, 192/47, 45

(56) References Cited

U.S. PATENT DOCUMENTS

| | | | | | |
|---|---|---|---|---|---|
| 2,286,760 | A | * | 6/1942 | Peterson | 192/38 |
| 3,691,854 | A | * | 9/1972 | Barthruff et al. | 192/45 |
| 4,030,581 | A | * | 6/1977 | Giometti | 192/38 |
| 4,531,620 | A | * | 7/1985 | Stone | 192/45 |
| 5,265,707 | A | * | 11/1993 | Abe et al. | 192/45 |
| 5,348,126 | A | * | 9/1994 | Gao | 192/44 |
| 6,041,879 | A | * | 3/2000 | Itoh et al. | 192/48.2 |
| 6,044,944 | A | * | 4/2000 | Adams et al. | 192/44 |
| 6,244,403 | B1 | * | 6/2001 | Ito et al. | 192/44 |
| 6,536,570 | B2 | * | 3/2003 | Ito et al. | 192/44 |
| 2002/0170795 | A1 | * | 11/2002 | Yasui et al. | 192/44 |

* cited by examiner

*Primary Examiner*—Saul Rodriguez
(74) *Attorney, Agent, or Firm*—Brinks Hofer Gilson & Lione

(57) ABSTRACT

A clutch mechanism is disclosed for use with a hybrid electric vehicle wherein the electric motor/generator and engine are arranged in a series configuration. The clutch mechanism is positioned between and in communication with the electric motor/generator and engine to allow the electric motor/generator to either: 1) provide sole motive power to the vehicle; 2) start the engine; 3) charge the vehicle's battery; 4) provide a power boost; or 5) provide regenerative braking. The clutch mechanism includes an outer race, an inner race, a roller set positioned between the inner and outer races, and a roller cage positioned adjacent the roller set to contain the roller set. The electric motor is preferably an integrated electric motor and generator. The engine is preferably a combustion engine.

12 Claims, 9 Drawing Sheets

INTEGRATED STARTER-GENERATOR ROLLER CLUTCH

BACKGROUND OF THE INVENTION

Hybrid electric vehicles ("HEV") are known to include two power sources to drive the vehicle. It is known to use an electric motor in combination with an engine. The two power sources either operate individually or simultaneously. Therefore, there is a need for a mechanism to be positioned between the two power sources to allow for either or both power sources to drive the vehicle.

BRIEF SUMMARY OF THE INVENTION

The present invention addresses these requirements by providing a bi-directional roller clutch that rotationally links the crankshaft of a combustion engine and an output shaft of an electric motor to the transmission input shaft. Control logic will signal actuation of the bi-directional roller clutch as needed to permit the electric motor to be used to solely drive the vehicle, start the combustion engine, charge the vehicle's electric system, provide a power boost to the vehicle, or allow for regenerative braking.

DETAILED DESCRIPTION OF THE INVENTION

Figure 1:
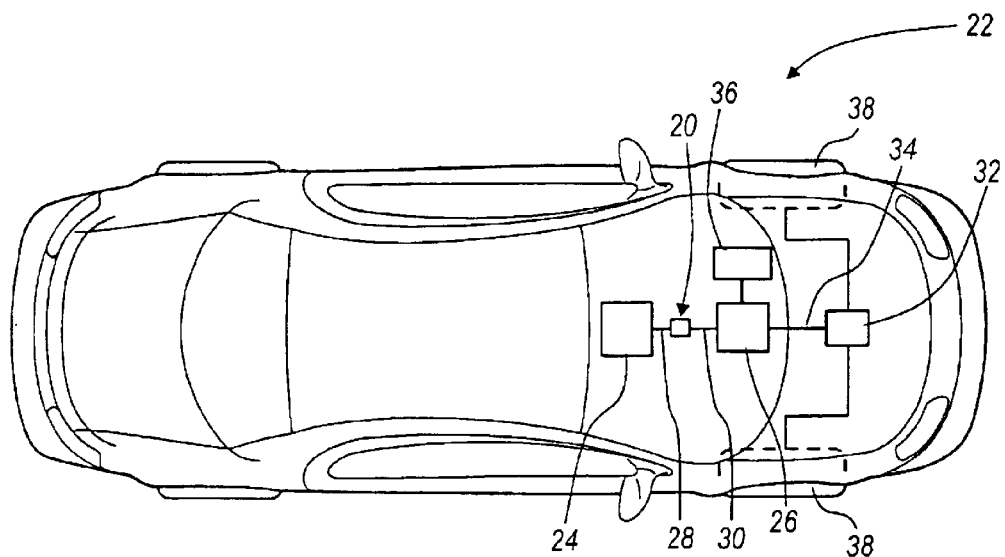
FIG. 1 is a top view of the present invention installed in a vehicle.

As shown in FIG. 1, the clutch mechanism of the present invention, shown generally at 20, is preferably used on a hybrid electric vehicle ("HEV"), shown generally at 22. The engine 24 and the electric motor-generator 26 are rotationally linked through the clutch 20. The engine 24 and the electric motor-generator 26 could be concentrically arranged. If the engine 24 and the electric motor 26 are concentrically arranged their centers would be aligned.

The clutch mechanism 20 rotationally links the crankshaft 28 of a combustion engine 24 and the output 30 of an electric motor-generator 26 to the transmission 32 input shaft 34. Preferably, the electric motor-generator 26 is linked directly to the vehicle's transmission 32 while the clutch mechanism 20 is installed in series between the engine 24 and the electric motor-generator 26.

By operating in either a disengaged mode or an engaged mode, the clutch mechanism 20 allows the electric motor-generator 26 to perform one of five different functions. The electric motor/generator 26 is capable of: 1) providing sole motive power to the vehicle; 2) starting the engine; 3) charging the vehicle's battery; 4) providing a power boost; and 5) providing regenerative braking.

During the disengaged mode, the electric motor-generator 26 can provide sole motive power to the vehicle 22 without any parasitic loading through the engine 24. In this mode, the vehicle 22 is essentially operating as an electric vehicle because the engine 24 is disconnected from the electric motor-generator 26.

The other four functions of the electric motor-generator 26 can only be performed during the engaged mode. One function involves the electric motor-generator 26 cranking the engine 24 to start it. During this function, the electric motor-generator 26 acts as a starter motor. While the vehicle 22 is usually stopped in this mode, it could also be done while the vehicle 22 is moving to switch from electric propulsion to hybrid (electric in combination with engine) or engine only propulsion.

A second function of the electric motor-generator 26 during the engaged mode involves the engine 24 driving the electric motor-generator 26 while providing propulsion to the vehicle 22. Here, the electric motor-generator 26 is used to charge the vehicle's battery 36 or electric system.

A third function of the electric motor-generator 26 during the engaged mode involves the engine 24 providing most of the vehicle's propulsion power with additional power being supplied by the electric motor-generator 26. Here, the electric motor-generator 26 acts as a power booster.

A fourth function of the electric motor 26 during the engaged mode involves both the engine 24 and the electric motor 26 decelerating to provide braking to the wheels 38 of the vehicle 22. Here the electric motor-generator 26 can be controlled to provide "regenerative" braking, which has been found to be a more efficient method of slowing the vehicle 22.

Figure 2:
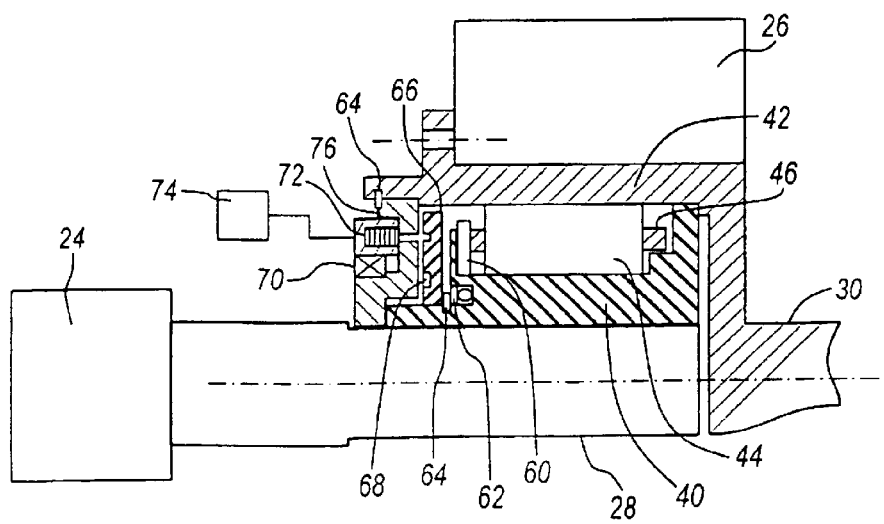
FIG. 2 is a radial half-section view of a first embodiment of the present invention.
Figure 3:
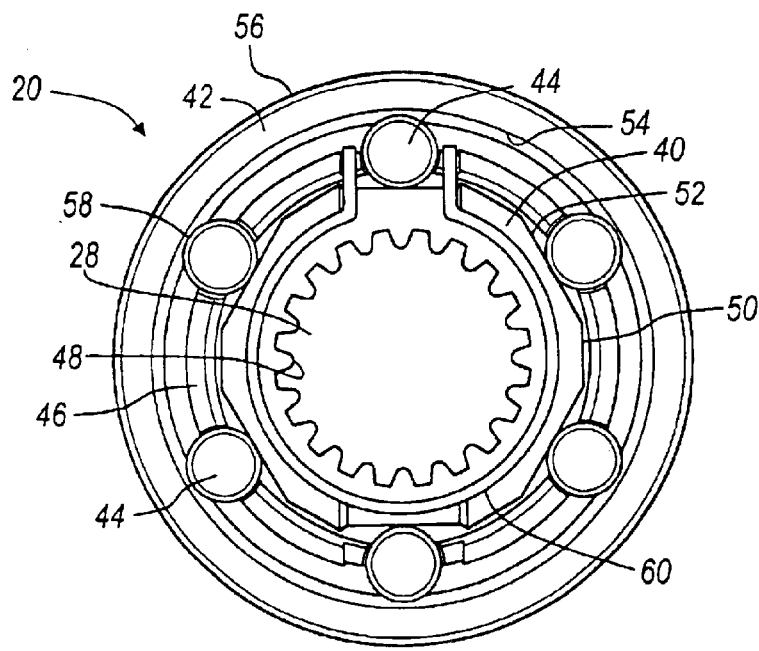
FIG. 3 is an axial view of a first embodiment of the present invention in the disengaged mode.

FIGS. 2 and 3 illustrate a first embodiment of the clutch mechanism 20. FIG. 2 is a radial view of the clutch mechanism 20 showing the axial relationship of the components in the clutch mechanism 20. FIG. 3 is an axial view of the clutch mechanism 20 showing the radial relationship of some of the clutch components.

The clutch mechanism 20 is a bi-directional roller clutch mechanism that is capable of operating in an engaged mode and a disengaged mode. The components of the bi-directional roller clutch 20 include an inner race 40, an outer race 42, a roller set 44 positioned between the inner race 40 and the outer race 42, and a roller cage 46 positioned adjacent to the roller set 44 to contain the roller set 44. The roller set 44 allows operation of the clutch mechanism 20 in the engaged mode and in the disengaged mode.

In this first embodiment, the inner race 40 is connected to the engine crankshaft 28 and the outer race 42 is connected to the electric motor 26 and/or the output shaft 30.

Figure 19:
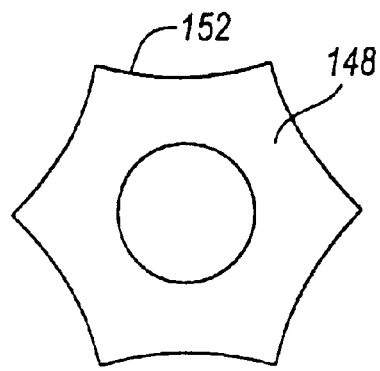
FIG. 19 is an axial view of an inner race having concave curved cammed surfaces.

As shown in FIG. 3, the inner race 40 has a cross-section having an inner circumference 48 and an outer surface 50. The inner circumference 48 is generally cylindrical-shaped and the outer surface 50 is generally multi-faceted. In other words, the outer surface 50 has numerous cammed surfaces 52. The cammed surfaces are preferably flat but could be slightly dished or concave as shown in FIG. 19. The inner circumference 48 could include splines for mating with the engine crankshaft.

Figure 20:
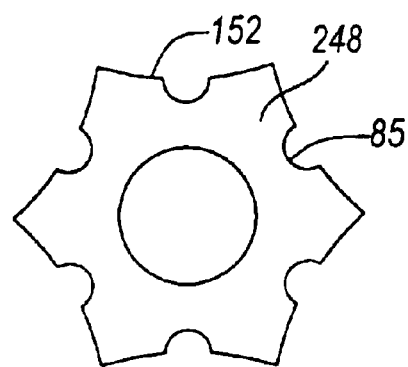
FIG. 20 is an axial view of an inner race having concave curved cammed surfaces with a dimple in the center.
Figure 21:
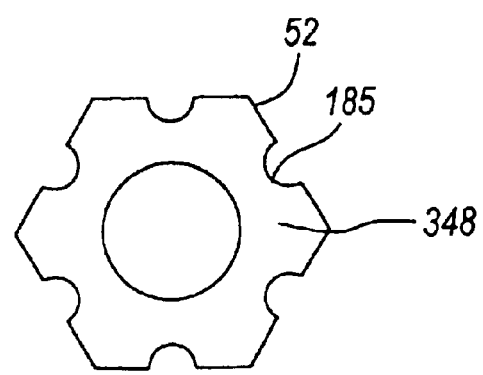
FIG. 21 is an axial view of an inner race having flat cammed surfaces with a dimple in the center.

Each cammed surface, either flat or concave, could include a dimple in the center of the surface, as shown in FIGS. 20 and 21. The dimple helps to maintain the position of the corresponding roller in the center of the cammed surface. FIG. 19 illustrates an inner race 148 having one cammed surface 152 per roller where the cammed surface 152 is curved in a concave manner. FIG. 20 illustrates an inner race 248 having one concave curved cammed surface 152 per roller having a dimple 85 in the center of the cammed surface. FIG. 21 illustrates an inner race 348 having one flat cammed surface 52 per roller having a dimple 185 in the center of the cammed surface.

The outer race 42 also has a cross section having an inner circumference 54 and an outer circumference 56. However, both the inner and outer circumferences 54, 56 are generally cylindrical-shaped.

The roller set 44 includes at least three cylindrical-shaped rollers. Alternatively, the roller set 44 could include at least three spherical-shaped rollers or balls. Preferably, the rollers are made from metal. Each roller, either cylindrically or spherically shaped, is positioned adjacent to and in the middle of a corresponding cammed surface 52 when the clutch is in the disengaged position.

Preferably, there is one roller per every four (4)–ten (10) millimeters of the outer race's inner diameter. Further, there is one cammed surface corresponding to each roller. In other words, there are the same number of rollers and cammed surfaces. Alternatively, there could be two cammed surfaces for each roller.

There is a clearance space 58 between the roller set 44 and the outer race inner circumference 54. In the disengaged mode, the roller set 44 and the roller cage 46 are biased against the inner race outer circumference 50. Therefore, the roller set 44 and the roller cage 46 rotate in sync with the inner race 40, which is connected to the engine crankshaft 28. The clearance space 58 allows the inner and outer races 40, 42 to rotate independent of each other in the disengaged mode.

Figure 4:
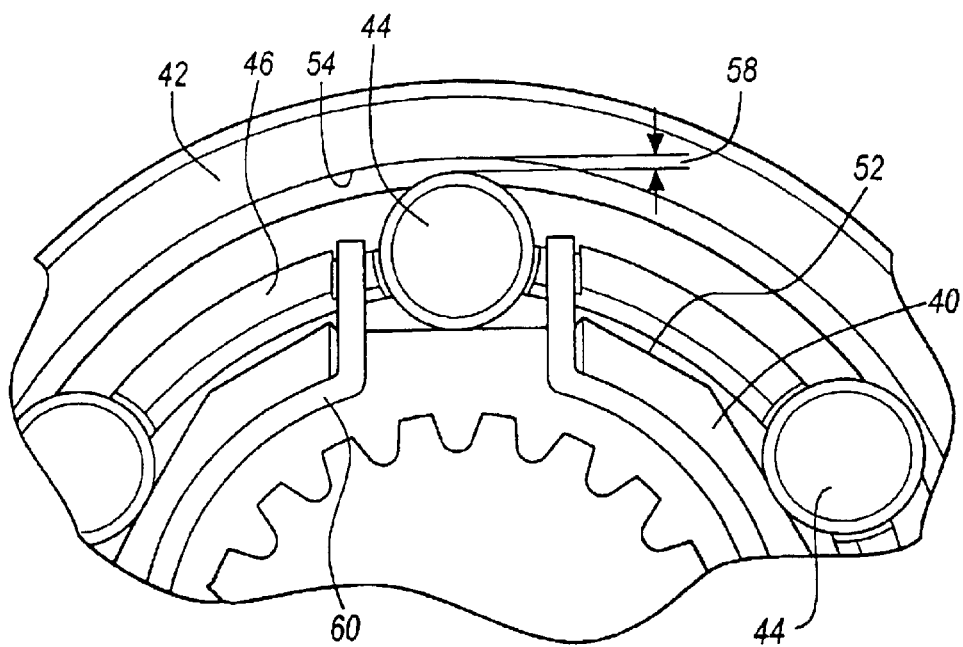
FIG. 4 is an axial view of some of the components of the first embodiment of the present invention in the disengaged mode.

Again referring to FIG. 2, the clutch mechanism 20 also includes a centering spring 60. A means could also be used for maintaining the axial position of the centering spring and roller set. In one embodiment, the means preferably includes a retaining washer 62 and a snap ring 64. As shown in FIGS. 2 and 4, these three components 60, 62, 64 work together to maintain the radial, circumferential, and axial position of the roller set 44 and roller cage 46 adjacent to and in the middle of the cammed surfaces 52 in the disengaged mode of operation. Specifically, the centering spring 60 maintains the roller cage 46 so that the circumferential position of the roller set 44 is maintained in the middle of the cammed surfaces 52. The retaining washer 62 is positioned adjacent the centering spring 60 for maintaining the axial position of the centering spring 60. The snap ring 64 maintains the axial positions of the centering spring 60 and the retaining washer 62.

Figure 5:
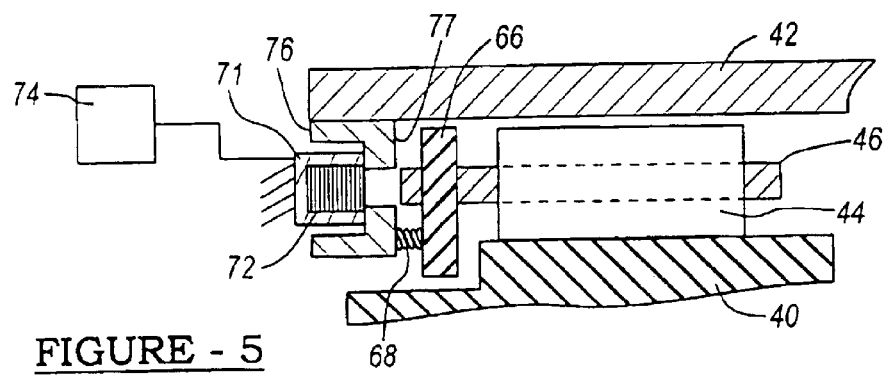
FIG. 5 is a radial view of some of the components of the first embodiment of the present invention in the disengaged mode.

As shown in FIGS. 2 and 5, the clutch mechanism 20 further includes an actuation disk 66 and a spring member 68 to axially position the actuation disk 66 in the disengaged mode. The spring member could be a wave washer or any other means to axially position the actuation disk. The actuation disk 66 is axially moveable between a disengaged position during the clutch mechanism's disengaged mode of operation, shown in FIG. 5, and an engaged position during the clutch mechanism's engaged mode of operation. The actuation disk 66 is rotationally connected to the roller cage 46 but can move axially. The actuation disk 66 is not in contact with the outer race 42 in the disengaged position. On the other hand, the actuation disk 66 is in contact with the surface 77 of the armature 76 attached to the outer race 42 in the engaged position.

Several other components of the clutch mechanism are a stationary housing 71, with alternatively a support bearing 70, an electromagnetic coil 72 and controller 74. The stationary housing 71 houses the electromagnetic coil 72. The controller 74 prompts the clutch mechanism 20 to operate either in the engaged mode or the disengaged mode.

Figure 6:
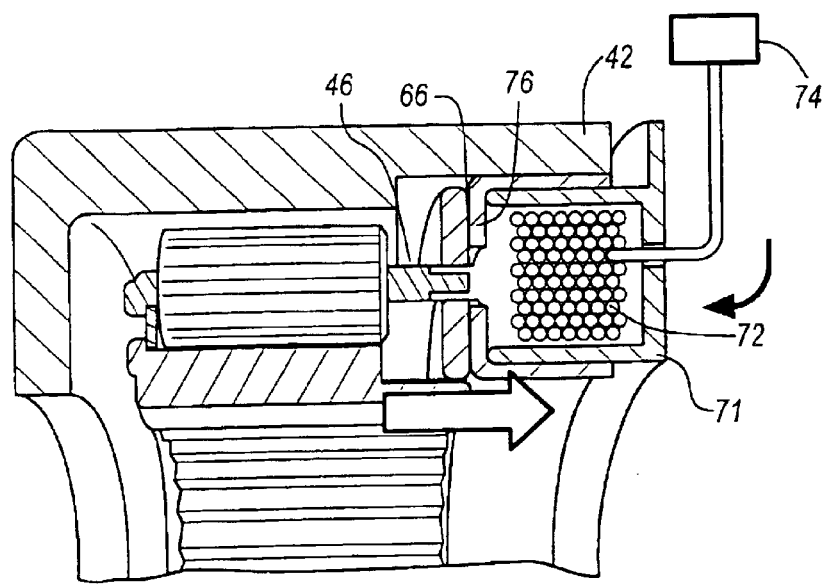
FIG. 6 is a radial view of some components of the first embodiment of the present invention in the engaged mode.

As shown in FIG. 6, the controller 74 will prompt an electrical current to be sent through the electromagnetic coil 72 to initiate the engaged mode. The electromagnetic coil 72 produces a magnetic field in the armature as the electrical current flows through the coil 72. The magnetic field draws the actuation disk 66 into the engaged position.

Figure 7:
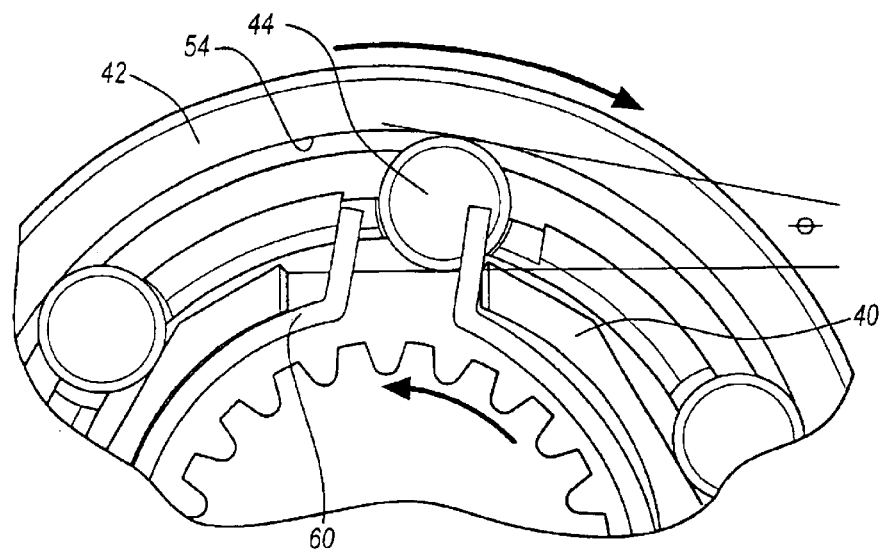
FIG. 7 is an axial view of some of the components of the first embodiment of the present invention in the engaged mode.

In the engaged mode, the actuation disk 66 which is connected to the roller cage 46 is drawn into contact with the outer race 42. The actuation disk 66 actually contacts an armature surface 76 of the outer race 42. Preferably, the armature surface 76 may be a separate component that is pressed in place to the outer race 42. Alternatively, the armature surface 76 may be an integral component of the outer race 42. The force drawing the actuation disk 66 toward the outer race 42 is strong enough to overcome the axial force of the wave washer 68 so that the actuation disk 66 contacts the outer race 42 or alternatively the armature 76. Thus, the friction between the actuation disk 66 and outer race 42 or armature 76 is strong enough to overcome the force of the centering spring 60 so that the rollers 44 are moved from their position in the middle of the outer surface 50 cammed surfaces of the inner race 40. Therefore, the roller set 44 is moved relative to the inner race 40 as shown in FIG. 7.

Figure 8:
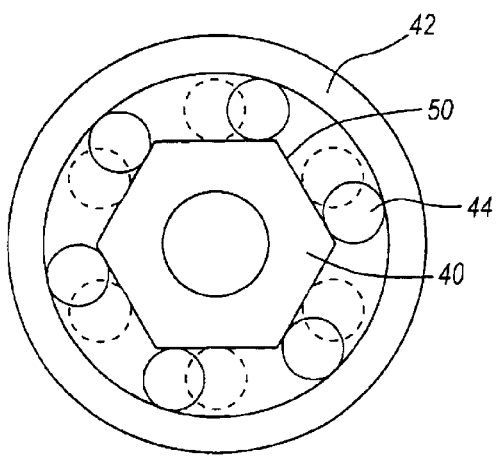
FIG. 8 is an axial view of the first embodiment of the present invention in the engaged mode of operation.

As a result, the engine crankshaft 28 will rotate the inner race 40 when the clutch is engaged. The inner race 40 will rotate but the roller set 44 will not rotate in sync with the inner race 40. Rather, as shown in FIGS. 7 and 8, when the inner race 40 rotates relative to the roller set 44 as shown by the rollers drawn in the solid lines they become wedged between the inner race 40 outer cammed surfaces 50 and the outer race 42 inner circumference 54. This will lock the inner and outer races 40, 42 together forcing them to rotate in sync during the engaged mode.

When the disengaged mode is desired, the controller 74 will prevent an electrical current from being sent through the electromagnetic coil 72 in the disengaged mode. Therefore, the actuation disk 66 will be pushed away from engagement with the outer race 42 armature surface 76 by the wave washer 68 and the forces of the centering spring 60 will move the roller set 44 and the roller cage 46 back to the disengaged position in which the rollers are held in the middle of the cammed surfaces on the inner race 40 outer circumference 50 to allow the inner and outer races 40, 42 to rotate independent of each other.

Figure 9:
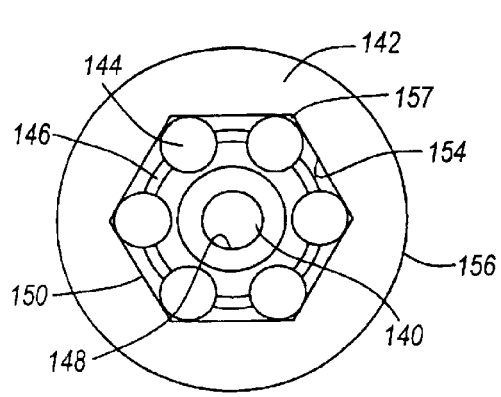
FIG. 9 is an axial view of a second embodiment of the present invention.
Figure 10:
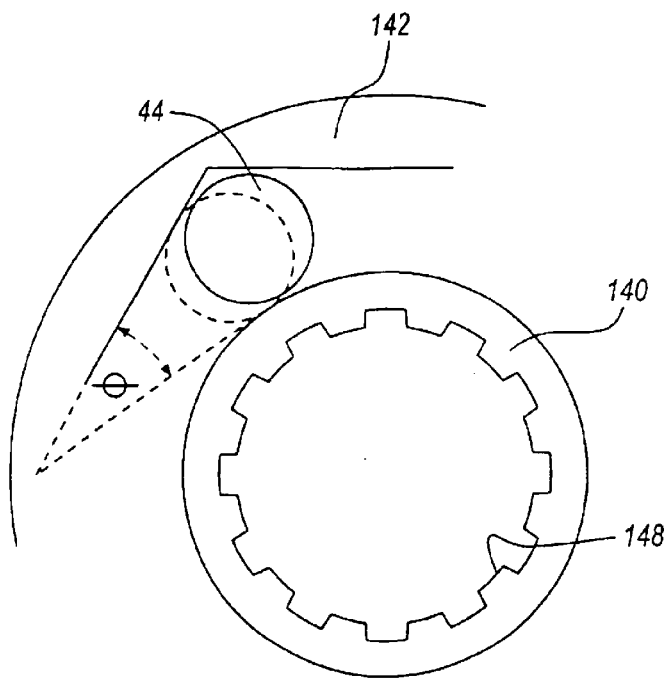
FIG. 10 is a partial axial view of the clutch mechanism second embodiment.

Alternatively, as shown in FIG. 9, the inner race 140 has generally cylindrical-shaped inner and outer circumferences 148, 150. However, the outer race 142 has a multi-faceted inner circumference 154 and a generally cylindrical-shaped outer circumference 156. In this embodiment, the roller cage must hold the rollers at the apex 157 of the faceted surfaces on the outer race and the centering spring must maintain the relative rotational positions of the roller cage, rollers and outer race. As shown in FIG. 10, either the first or the second embodiment is sufficient to cause lock-up so long as the angle, θ, is less than or equal to the arctangent of the coefficient of friction, $\mu$ ($\theta \leq \arctan \mu$). Preferably the angle, θ, falls within the range of 3–6°.

Figure 11:
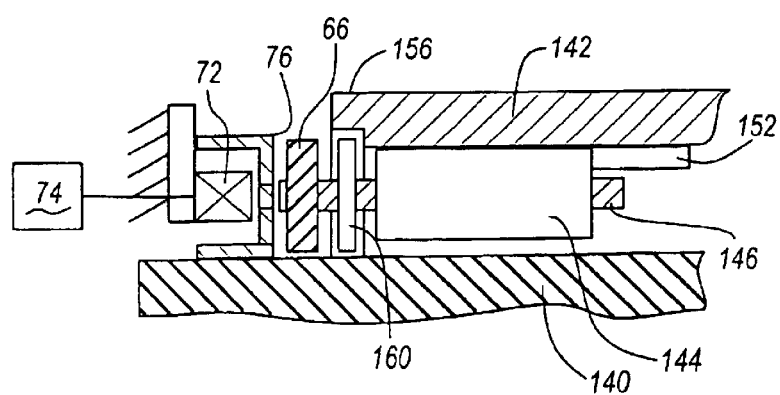
FIG. 11 is a radial view of some components of the second embodiment of the present invention.

With respect to the second embodiment, as shown in FIG. 11, the centering spring 160 holds the roller cage and thus the roller set 144 in circumferential position adjacent the apex of the cammed surfaces 152 of the outer race 142 inner circumference 154. In other words, the roller set 144 and roller cage 146 rotate in sync with the outer race 142 during the disengaged mode. During the engaged mode, the roller set 144 becomes wedged between the inner and outer races 140, 142 causing them to rotate in sync.

Figure 12:
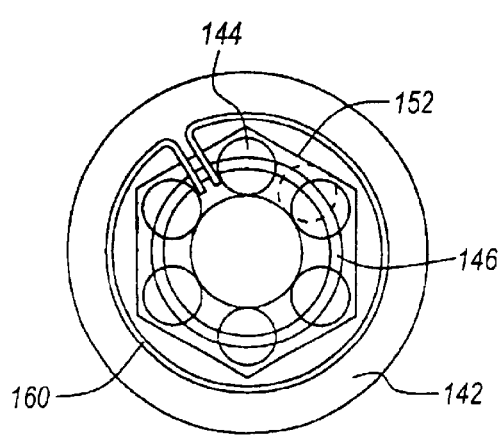
FIG. 12 is an axial view of some of the components of the second embodiment of the present invention.
Figure 12A:
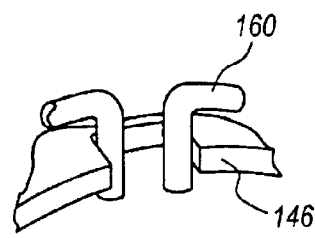

In the second embodiment, shown in FIG. 12, the centering spring 160 is positioned in a groove located in the outer race. The centering spring 160 maintains the circumferential position of the roller set 144 and roller cage 146.

Figure 13:
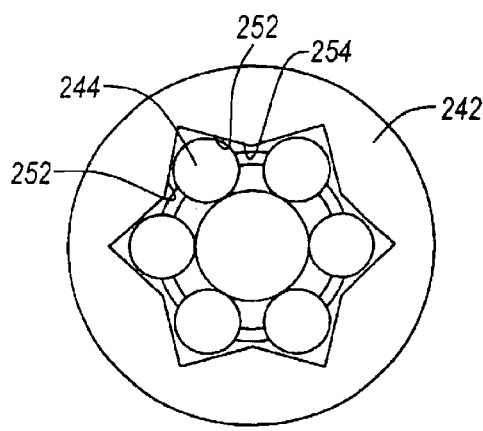
FIG. 13 is an axial view of a third embodiment of the present invention.

In a third embodiment, shown in FIG. 13, the outer race 242 inner circumference 254 could have two (2) cammed surfaces 252 for every roller in the roller set 244.

When the engaged mode is desired, the controller 74 prompts an electrical current to be sent through the electromagnetic coli 72 to initiate the engaged mode. The electromagnetic coil 72 produces a magnetic field as the electrical current flows through the coil 72. The magnetic field draws the actuation disk 66 into the engaged position.

The force drawing the actuation disk 66 toward the armature surface 76 attached to the inner race is strong enough to overcome the forces of the wave washer 68 so that the actuation disk contacts the armature surface 76 of the inner race. Thus, the force of the centering spring 60 is overcome so that the roller set and the roller cage are rotated relative to the outer race and the rollers are moved from their position in the apex of the cammed surfaces of the outer race. Therefore, the roller set is moved relative to the outer race. The result is that the roller set is rotated enough to cause lock-up when the inner and outer races engage and, therefore, rotate in sync.

When the disengaged mode is desired in the second and third embodiments, the rollers are moved back to the apex of the cammed surfaces on the outer race inner circumference to allow the inner and outer races to rotate independent of each other.

Figure 14:
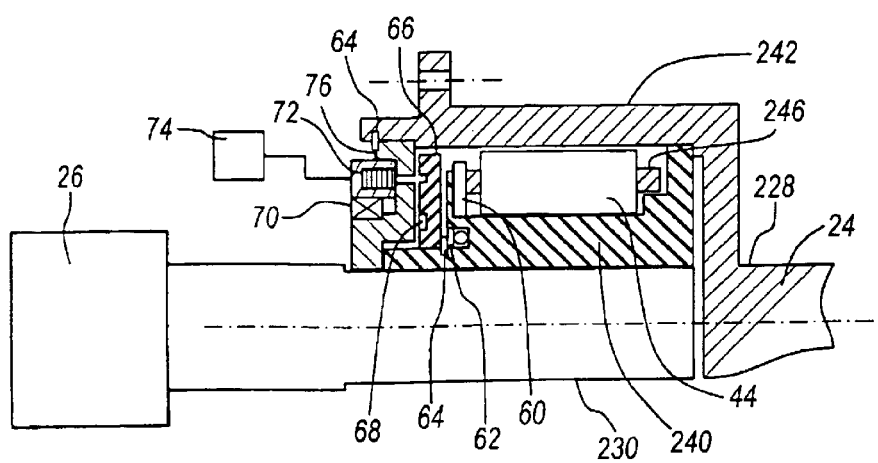
FIG. 14 is a radial half-section view of a fourth embodiment of the present invention.
Figure 15:
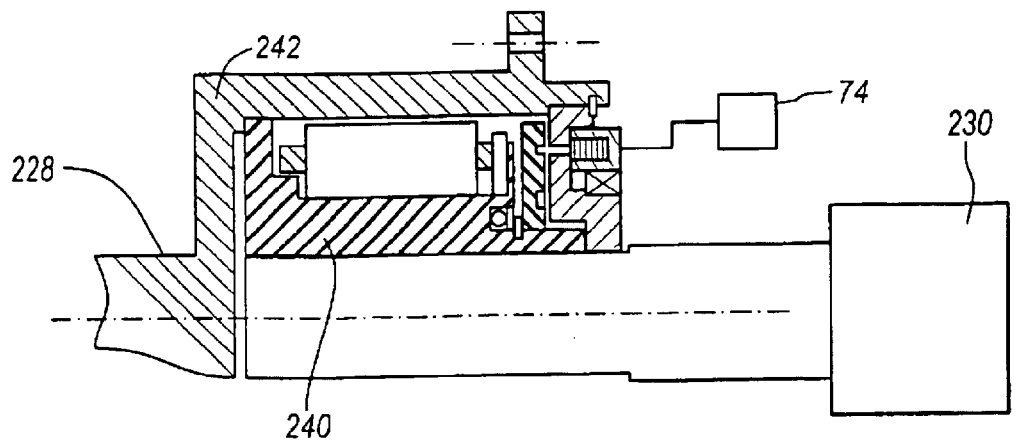
FIG. 15 is a radial view of some of the components of the fourth embodiment of the present invention.
Figure 16:
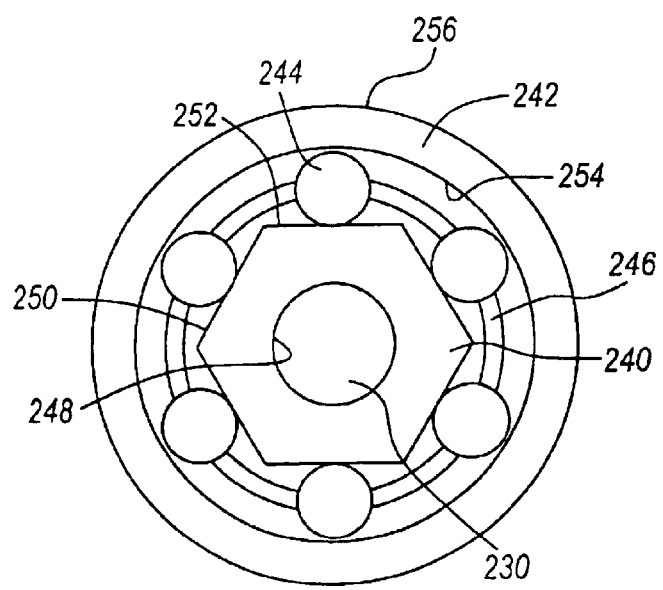
FIG. 16 is an axial view of the fourth embodiment of the present invention.

In a fourth embodiment, shown in FIGS. 14, 15 and 16, the inner race 240 is connected to the electric motor output shaft 230 and the outer race 242 is connected to the engine crankshaft 228. In this embodiment, all of the components are the same as explained in the first described embodiment. The only difference is that the inner race 240 rotates in sync with the electric motor output shaft 230 and the outer race 242 rotates in sync with the engine crankshaft 228. In the fourth embodiment, the inner race 240 has cammed surfaces 252 on the outer circumference 250 and a generally circular shaped inner circumference 248. The outer race 242 has generally cylindrical-shaped inner and outer circumferences 254, 256. In the disengaged mode, the roller set 244 is held by the roller cage in the middle of the cammed surfaces 252 of the inner race outer circumference 250.

Figure 17:
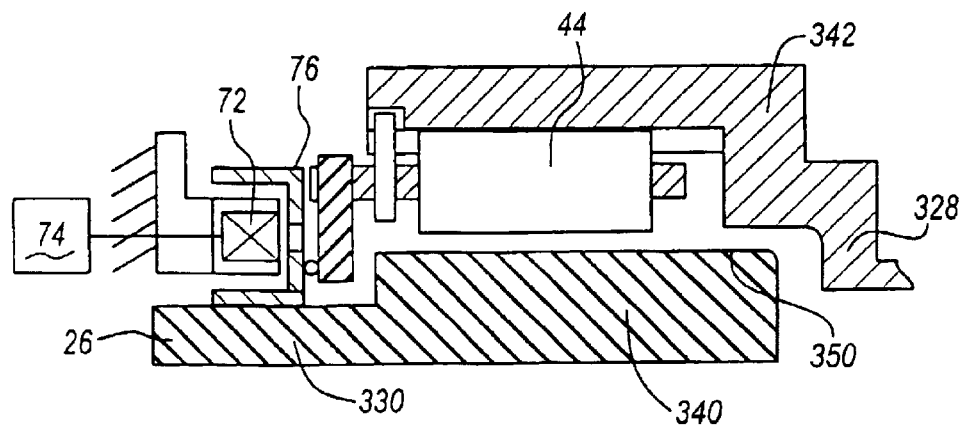
FIG. 17 is a radial half-section view of a fifth embodiment of the present invention.
Figure 18:
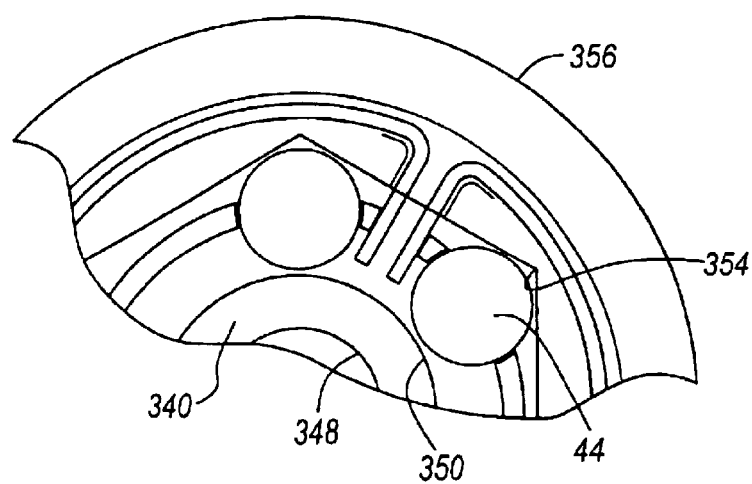
FIG. 18 is an axial view of some of the components of the fifth embodiment of the present invention

In a fifth embodiment, shown in FIGS. 17 and 18, the inner race 340 is connected to the electric motor output shaft 330 and the outer race 342 is connected to the engine crankshaft 328. The inner race 340 has generally cylindrical-shaped inner and outer circumferences 348, 350. However, the outer race 342 has a generally multi-faceted inner circumference 354 and a generally cylindrical-shaped outer circumference 356.

It is important to note that although the engaged mode is disclosed as being electromagnetically activated, it could also be hydraulically or pneumatically activated.

Preferably, specialty hardened materials are used for the inner race, outer race and rollers in the roller set. Some materials that could be used include, but are not limited to, A2 tool steel, SAE8620 and SAE52100. These materials provide sufficient structural strength to withstand the high contact stress loads that can be experienced in these applications.

Electronic controls 74 can be used for the electric motor/generator 26 to synchronize the speeds between the electric motor/generator 26 and the engine 24 under certain operating conditions to minimize the relative speed difference between the inner and outer races 40, 42 to reduce or eliminate engagement noise or vibrations in the clutch mechanism 20.

While the above description constitutes the preferred embodiments of the present invention, it will be appreciated that the invention is susceptible to modification, variation and change without departing from the proper scope and fair meaning of the accompanying claims.

What is claimed is:

1. A roller clutch for a hybrid vehicle having an engine with a crankshaft and an electric motor with an output, said roller clutch comprising:
   a first race connected to one of the crankshaft and the output and having a generally faceted surface with at least three cammed surfaces, each of the cammed surfaces including a dimple formed within the cammed surface and positioned at a center of the cammed surface;
   a second race located concentrically with the first race, connected to the other of the crankshaft and the output, and having a cylindrically shaped surface;
   a roller set having at least three rollers positioned between the first race and the second race and adapted to provide selective engagement and disengagement of the first race and the second race;
   an electromagnetic coil adapted to selectively create an electromagnetic field;
   an armature coupled to the second race and adapted to conduct the electromagnetic field; and an activation disk adapted to move between a disengaged position, in which the actuation disk is disengaged with the second race, and an engaged position, in which the actuation disk is engaged with the second race, based on the presence of the electromagnetic field.

2. The invention of claim 1 wherein the cammed surfaces are generally flat.

3. The invention of claim 1 wherein the cammed surfaces are generally curved.

4. The invention of claim 1 further comprising a roller cage connected to the rollers, coupled to the activation disk, and adapted to maintain position of the rollers relative to each other.

5. The invention of claim 4 further comprising a centering spring coupled to the roller cage and the faceted surface of the first race and adapted to bias the roller cage and the rollers to rotate with the faceted surface.

6. The invention of claim 5 further comprising means for selectively engaging the second race and the roller cage.

7. The invention of claim 1 further comprising a spring member adapted to bias the actuation disk into the disengaged position in the absence of the electromagnetic field.

8. The invention of claim 7 wherein the spring member is a wave washer.

9. The invention of claim 1 further comprising a controller adapted to selectively actuate the electromagnetic coil.

10. The invention of claim 1 wherein the first race is connected to the crankshaft and the second race is connected to the output.

11. The invention of claim 10 wherein the second race is located concentrically outside the first race.

12. The invention of claim 1 wherein the second race is located concentrically outside the first race.

* * * * *